US012780742B2

(12) United States Patent
Ikarashi et al.

(10) Patent No.: US 12,780,742 B2
(45) Date of Patent: Nov. 3, 2026

(54) BORON NITRIDE SINTERED BODY, COMPOSITE BODY, AND MANUFACTURING METHODS THEREFOR, AND HEAT DISSIPATION MEMBER

(71) Applicant: Denka Company Limited, Tokyo (JP)

(72) Inventors: Koki Ikarashi, Tokyo (JP); Makoto Takeda, Tokyo (JP); Seiji Kobashi, Tokyo (JP); Koji Nishimura, Tokyo (JP)

(73) Assignee: Denka Company Limited, Tokyo (JP)

( * ) Notice: Subject to any disclaimer, the term of this patent is extended or adjusted under 35 U.S.C. 154(b) by 1046 days.

(21) Appl. No.: 17/908,786

(22) PCT Filed: Mar. 26, 2021

(86) PCT No.: PCT/JP2021/013048
§ 371 (c)(1),
(2) Date: Sep. 1, 2022

(87) PCT Pub. No.: WO2021/200719
PCT Pub. Date: Oct. 7, 2021

(65) Prior Publication Data
US 2023/0085806 A1 Mar. 23, 2023

(30) Foreign Application Priority Data
Mar. 31, 2020 (JP) ................................ 2020-064844

(51) Int. Cl.
*C04B 35/583* (2006.01)
*C04B 41/48* (2006.01)
*C04B 41/83* (2006.01)

(52) U.S. Cl.
CPC ........ *C04B 35/583* (2013.01); *C04B 41/4853* (2013.01); *C04B 41/83* (2013.01)

(58) Field of Classification Search
None
See application file for complete search history.

(56) References Cited

U.S. PATENT DOCUMENTS 5,531,945 A 7/1996 Ohya et al.
6,207,230 B1 3/2001 Ohya et al.
(Continued)

FOREIGN PATENT DOCUMENTS

CN 104942555 A 9/2015
CN 105263886 A 1/2016
(Continued)

OTHER PUBLICATIONS

State Intellectual Property Office, Office Action issued in Chinese Patent Application No. 202180022041.9 (Feb. 11, 2023).
(Continued)

*Primary Examiner* — Elizabeth Collister
(74) *Attorney, Agent, or Firm* — Leydig, Voit & Mayer, Ltd.

(57) ABSTRACT

Provided is a boron nitride sintered body including boron nitride particles and pores, the boron nitride sintered body having a sheet shape and a thickness of less than 2 mm. Provided is a method for manufacturing a boron nitride sintered body, the method including a sintering step of molding and heating a blend containing a boron carbonitride powder and a sintering aid to obtain a sheet-shaped boron nitride sintered body including boron nitride particles and pores, in which a thickness of the boron nitride sintered body obtained in the sintering step is less than 2 mm.

3 Claims, 2 Drawing Sheets

(56) References Cited

U.S. PATENT DOCUMENTS

| | | | |
|---|---|---|---|
| 2012/0114905 A1 | 5/2012 | Engler et al. | |
| 2015/0137026 A1 | 5/2015 | Engler et al. | |
| 2016/0060112 A1 | 3/2016 | Nishi et al. | |
| 2016/0130187 A1* | 5/2016 | Ikarashi | H05K 1/0373 524/404 |
| 2016/0227644 A1 | 8/2016 | Hirotsuru et al. | |
| 2017/0055339 A1 | 2/2017 | Zhang et al. | |
| 2017/0362440 A1 | 12/2017 | Bahon et al. | |
| 2019/0092695 A1* | 3/2019 | Nishi | C04B 38/0054 |
| 2019/0189534 A1 | 6/2019 | Yamagata et al. | |
| 2020/0031723 A1 | 1/2020 | Inoue et al. | |
| 2021/0017084 A1 | 1/2021 | Suzuki et al. | |
| 2021/0261413 A1 | 8/2021 | Takeda et al. | |
| 2022/0177375 A1 | 6/2022 | Inoue et al. | |
| 2023/0106510 A1 | 4/2023 | Takeda et al. | |

FOREIGN PATENT DOCUMENTS

| | | | |
|---|---|---|---|
| CN | 105453707 | A | 8/2016 |
| CN | 107922743 | A | 4/2018 |
| CN | 108516839 | A | 9/2018 |
| CN | 109153801 | A | 1/2019 |
| CN | 109790025 | A | 5/2019 |
| CN | 110168719 | A | 8/2019 |
| EP | 0 712 820 | A1 | 5/1996 |
| EP | 2 966 036 | A1 | 1/2016 |
| EP | 3 006 419 | A1 | 4/2016 |
| EP | 3 035 778 | A1 | 6/2016 |
| EP | 3 310 733 | A0 | 12/2016 |
| EP | 3 950 643 | A1 | 2/2022 |
| JP | H05-159624 | A | 6/1993 |
| JP | H08-244163 | A | 9/1996 |
| JP | H10-251069 | A | 9/1998 |
| JP | H11-019948 | A | 1/1999 |
| JP | 2002-114575 | A | 4/2002 |
| JP | 2003-037382 | A | 2/2003 |
| JP | 2007-308360 | A | 11/2007 |
| JP | 2010-157563 | A | 7/2010 |
| JP | 2014-162697 | A | 9/2014 |
| JP | 2015-096456 | A | 5/2015 |
| JP | 2015-124122 | A | 7/2015 |
| JP | 2016-044098 | A | 4/2016 |
| JP | 2016-103611 | A | 6/2016 |
| JP | 2016-111171 | A | 6/2016 |
| JP | 2017-165609 | A | 9/2017 |
| JP | 2018-145090 | A | 9/2018 |
| JP | 2019-073409 | A | 5/2019 |
| JP | 2019-145744 | A | 8/2019 |
| JP | 2020-047928 | A | 3/2020 |
| KR | 20130105682 | A | 9/2013 |
| WO | WO 2011/104996 | A1 | 9/2011 |
| WO | WO 2014/136959 | A1 | 9/2014 |
| WO | WO 2014/196496 | A1 | 12/2014 |
| WO | WO 2016/092952 | A1 | 6/2016 |
| WO | WO 2016/203164 | A1 | 12/2016 |
| WO | WO 2017/155110 | A1 | 9/2017 |
| WO | WO 2018/066277 | A1 | 4/2018 |
| WO | WO 2018/025933 | A1 | 8/2018 |
| WO | WO 2018/181606 | A1 | 10/2018 |
| WO | WO 2019/073690 | A1 | 4/2019 |
| WO | WO 2020/004600 | A1 | 1/2020 |
| WO | WO 2020/203692 | A1 | 10/2020 |
| WO | WO 2021/100807 | A1 | 5/2021 |
| WO | WO 2021/200719 | A1 | 10/2021 |
| WO | WO 2021/200725 | A1 | 10/2021 |
| WO | WO 2021/200969 | A1 | 10/2021 |

OTHER PUBLICATIONS

Japan Patent Office, International Search Report in International Application No. PCT/JP2020/013826 (Jun. 16, 2020).

Japan Patent Office, Written Opinion in International Application No. PCT/JP2020/013826 (Jun. 16, 2020).

International Bureau of WIPO, International Preliminary Report on Patentability in International Patent Application Number No. PCT/JP2020/013826 (Oct. 14, 2021).

European Patent Office, Extended European Search Report in European Application No. 20783042.3 (Apr. 21, 2022).

European Patent Office, Communication pursuant to Article 94(3) EPC in European Patent Application No. 20783042.3 (Jan. 31, 2023).

Japan Patent Office, International Search Report issued in International Application No. PCT/JP2021/013574 (Jun. 22, 2021).

The International Bureau of WIPO, International Preliminary Report on Patentability issued in International Application No. PCT/JP2021/013574 (Oct. 13, 2022).

European Patent Office, Partial Supplementary European Search Report issued in European Patent Application No. 21780117.4 (Aug. 4, 2023).

State Intellectual Property Office, Office Action issued in Chinese Patent Application No. 202180017371.9, (Feb. 9, 2023).

The International Bureau of WIPO, International Preliminary Report on Patentability issued in International Application No. PCT/JP2021/013048 (Oct. 13, 2022).

The International Bureau of WIPO, International Preliminary Report on Patentability issued in International Application No. PCT/JP2021/013054 (Oct. 13, 2022).

European Patent Office, Extended European Search Report issued in European Patent Application No. 21781730.3 (Jun. 6, 2023).

State Intellectual Property Office, Office Action issued in Chinese Patent Application No. 202180013551.X (Jan. 4, 2023).

United States Patent and Trademark Office, Notice of Allowance issued in U.S. Appl. No. 17/907,515 (Jun. 27, 2024).

The International Bureau of WIPO, International Preliminary Report on Patentability issued in International Application No. PCT/JP2021/013655 (Oct. 13, 2022).

Japan Patent Office, International Search Report issued in International Application No. PCT/JP2021/013054 (May 25, 2021).

Japan Patent Office, International Search Report issued in International Application No. PCT/JP2021/013048 (May 25, 2021).

State Intellectual Property Office, Office Action issued in Chinese Patent Application No. 202180022041.9 (Aug. 17, 2023).

European Patent Office, Extended European Search Report issued in European Patent Application No. 21781629.7 (Jul. 13, 2023).

United States Patent and Trademark Office, Office Action issued in U.S. Appl. No. 17/907,515 (Dec. 21, 2023).

* cited by examiner

BORON NITRIDE SINTERED BODY, COMPOSITE BODY, AND MANUFACTURING METHODS THEREFOR, AND HEAT DISSIPATION MEMBER

CROSS-REFERENCE TO RELATED APPLICATIONS

This patent application is the U.S. national phase of International Application No. PCT/JP2021/013048, filed on Mar. 26, 2021, which claims the benefit of Japanese Patent Application No. 2020-064844, filed Mar. 31, 2020, the disclosures of which are incorporated herein by reference in their entireties for all purposes.

TECHNICAL FIELD

The present disclosure relates to a boron nitride sintered body, a composite body, and manufacturing methods therefor, and a heat dissipation member.

BACKGROUND ART

In components such as a power device, a transistor, a thyristor, and a CPU, efficient dissipation of heat generated during use thereof is required. From such a request, conventionally, a thermal conductivity of an insulating layer of a printed-wiring board onto which an electronic component is to be mounted has been improved, or an electronic component or a printed-wiring board has been mounted onto a heat sink via thermal interface materials having electrical insulation properties. A composite body (heat dissipation member) configured by a resin and ceramic such as boron nitride is used for the insulating layer and the thermal interface material described above.

It has been studied to use a composite body obtained by impregnating a porous ceramic molded body with a resin as such a composite body. Boron nitride has lubricity, high thermal conducting properties, insulation properties, and the like, and from this aspect, it has been studied to use ceramic containing boron nitride for a heat dissipation member. Patent Literature 1 has proposed a technique of adjusting an orientation degree and a graphitization index in predetermined ranges to decrease the anisotropy of the thermal conductivity while attaining an excellent thermal conductivity.

CITATION LIST

Patent Literature

Patent Literature 1: Japanese Unexamined Patent Publication No. 2014-162697

SUMMARY OF INVENTION

Technical Problem

With an increase in integration density of a circuit inside an electronic component in recent years, a heat dissipation member having both excellent electrical insulation properties and thermal conducting properties has been required. Since a space where an electronic component is to be mounted is usually limited while an increase in function of various members is required as described above, it is conceivable that establishment of a technique of decreasing the size of a member to be mounted on an electronic component is also necessary.

In this regard, the present disclosure provides a boron nitride sintered body and a composite body which are thin and suitable as a member of an electronic component and the like, and manufacturing methods therefor. Furthermore, the present disclosure provides a heat dissipation member which is suitable as a member of an electronic component and the like.

Solution to Problem

In an aspect of the present disclosure, there is provided a boron nitride sintered body including boron nitride particles and pores, the boron nitride sintered body having a sheet shape and a thickness of less than 2 mm. Since such a boron nitride sintered body includes the boron nitride particles, the boron nitride sintered body is excellent in electrical insulation properties and thermal conducting properties. Furthermore, since the thickness thereof is less than 2 mm, the boron nitride sintered body is thin, and when the boron nitride sintered body is used as a member of an electronic component and the like, an electronic component and the like can be decreased in size. Hence the boron nitride sintered body is suitable as a member of an electronic component and the like. Furthermore, since the boron nitride sintered body is thin and includes the pores, a decrease in weight can be attained, and a composite body can also be obtained by smoothly filling a resin in the pores.

An orientation index of the boron nitride sintered body may be 40 or less. When molded in a sheet shape, the boron nitride particles are usually oriented in a direction perpendicular to a thickness direction, and a thermal conductivity in the thickness direction tends to decrease. However, such a tendency can be reduced by decreasing the orientation index. Therefore, the anisotropy of the thermal conductivity can be sufficiently decreased, and the thermal conducting properties in the thickness direction can be sufficiently enhanced.

A porosity in the boron nitride sintered body may be 30 to 65% by volume. Furthermore, a bulk density may be 800 to 1500 kg/m$^3$. When at least one of the porosity and the bulk density is in this range, a decrease in weight can be attained while sufficiently increasing the thermal conductivity. Furthermore, a composite body in which both an excellent thermal conductivity and electrical insulation properties can be achieved at a high level can also be formed with such a boron nitride sintered body.

An average pore diameter of the pores of the boron nitride sintered body may be less than 4.0 μm. A contact area between primary particles of boron nitride can be sufficiently increased by decreasing the size of the pores in this way. Therefore, the thermal conductivity can be sufficiently increased.

The boron nitride sintered body may not have a cut plane. Such a boron nitride sintered body does not have fine cracks that may be generated attributable to cutting. Hence reliability as a member can be further improved.

According to an aspect of the present disclosure, there is provided a composite body including any of the above-described boron nitride sintered bodies and a resin filled in at least some of the pores of the boron nitride sintered body. This composite body includes the above-described boron nitride sintered body and the resin, and from this aspect, has both an excellent thermal conductivity and excellent electrical insulation properties. Furthermore, since the composite body is thin and lightweight, when the composite body is used as a member of an electronic component and the like, a decrease in size and weight can be achieved. Hence the composite body is suitable as a member of an electronic component and the like.

According to an aspect of the present disclosure, there is provided a heat dissipation member having the above-described composite body. This heat dissipation member has the above-described composite body, and from this aspect, has both an excellent thermal conductivity and excellent electrical insulation properties. Furthermore, since the heat dissipation member is thin and lightweight, when the heat dissipation member is used as a heat dissipation member of an electronic component and the like, a decrease in size and weight can be achieved. Hence the heat dissipation member is suitable as a member of an electronic component and the like.

According to an aspect of the present disclosure, there is provided a method for manufacturing a composite body, the method including an impregnating step of impregnating any of the above-described boron nitride sintered bodies with a resin composition, the composite body having the boron nitride sintered body and a resin filled in at least some of the pores of the boron nitride sintered body. In this manufacturing method, since a sheet-shaped boron nitride sintered body having a thickness of less than 2 mm is used, the impregnating of the resin composition smoothly proceeds. Thereby, a composite body having a high filling rate of the resin and excellent electrical insulation properties can be easily obtained. Furthermore, since the above-described boron nitride sintered body is used, the composite body has excellent electrical insulation properties and thermal conducting properties. Furthermore, since a decrease in thickness and weight can be attained, when the composite body is used as a member of an electronic component and the like, a decrease in size and weight can be achieved. Accordingly, the composite body is suitable as a member of an electronic component and the like.

According to an aspect of the present disclosure, there is provided a method for manufacturing a boron nitride sintered body, the method including a sintering step of molding and heating a blend containing a boron carbonitride powder and a sintering aid to obtain a boron nitride sintered body including boron nitride particles and pores, in which a thickness of the boron nitride sintered body obtained in the sintering step is less than 2 mm.

According to an aspect of the present disclosure, there is provided a method for manufacturing a boron nitride sintered body, the method including: a nitriding step of firing a boron carbide powder in a nitrogen atmosphere to obtain a fired product containing boron carbonitride; and a sintering step of molding and heating a blend containing the fired product and a sintering aid to obtain a boron nitride sintered body including boron nitride particles and pores, in which a thickness of the boron nitride sintered body obtained in the sintering step is less than 2 mm.

Since the boron nitride sintered body obtained by these manufacturing methods includes the boron nitride particles, the boron nitride sintered body is excellent in electrical insulation properties and thermal conducting properties. Furthermore, since the thickness thereof is less than 2 mm, the boron nitride sintered body is thin, and when the boron nitride sintered body is used as a member ofa circuit, a circuit can be decreased in size. Furthermore, since the boron nitride sintered body is thin and also includes the pores, a decrease in weight can be attained, and a composite body can also be obtained by smoothly filling a resin in the pores. Furthermore, since the fired product containing boron carbonitride is used, the anisotropy of the thermal conductivity of the sheet-shaped boron nitride sintered body can be sufficiently decreased, and the thermal conducting properties in the thickness direction can be sufficiently enhanced. Accordingly, the boron nitride sintered body is suitable as a member of an electronic component and the like.

According to an aspect of the present disclosure, there is provided a method for manufacturing a composite body, the method including an impregnating step of impregnating a boron nitride sintered body obtained by any of the above-described manufacturing methods with a resin composition, the composite body including the boron nitride sintered body and a resin filled in at least some of the pores of the boron nitride sintered body. The composite body obtained by such a manufacturing method includes the above-described boron nitride sintered body and the resin, and from this aspect, has both an excellent thermal conductivity and excellent electrical insulation properties. Furthermore, since the composite body is thin and lightweight, when the composite body is used as a member of an electronic component and the like, a decrease in size and weight can be achieved. Accordingly, the composite body is suitable as a member of an electronic component and the like.

Advantageous Effects of Invention

According to the present disclosure, it is possible to provide a boron nitride sintered body and a composite body which are thin and suitable as a member of an electronic component and the like, and manufacturing methods therefor. Furthermore, according to the present disclosure, it is possible to provide a heat dissipation member which is suitable as a member of an electronic component and the like.

DESCRIPTION OF EMBODIMENTS

Hereinafter, embodiments of the present disclosure will be described with reference to the drawings as necessary. However, the following embodiments are examples for describing the present disclosure and are not intended to limit the present disclosure to the following contents.

A boron nitride sintered body has a sheet shape (thin plate shape). The boron nitride sintered body is porous and a thickness thereof is less than 2 mm. The boron nitride sintered body includes boron nitride particles, which are configured by sintering primary particles of boron nitride, and pores (The boron nitride sintered body includes parts obtained by sintering primary particles of boron nitride and pores formed by the sintered primary particles.). Since the boron nitride sintered body includes the boron nitride particles (is formed by sintering primary particles of boron nitride), the boron nitride sintered body is excellent in electrical insulation properties and thermal conducting properties. The boron nitride sintered body may be configured by the boron nitride particles.

Since the thickness thereof is less than 2 mm, the boron nitride sintered body is thin, and when the boron nitride sintered body is used as a member of an electronic component and the like, an electronic component and the like can be decreased in size. Furthermore, since the boron nitride sintered body is thin and also includes the pores, a decrease in weight can be attained, and a composite body can also be obtained by smoothly filling a resin in the pores. (Note that, sintering of primary particles also includes sintering of primary particles in secondary particles.)

From the viewpoint of further decreasing a size and a weight, the thickness of the boron nitride sintered body may be less than 1 mm, or may be less than 0.5 mm. From the viewpoint of ease of producing a molded body, the thickness of the boron nitride sintered body may be 0.1 mm or more, or may be 0.2 mm or more.

Figure 1:
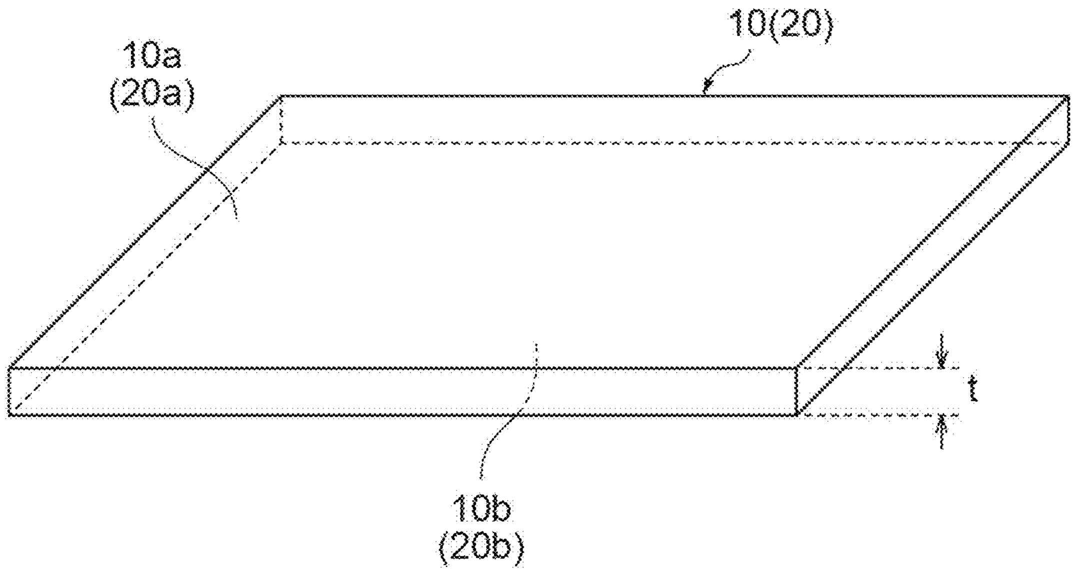
FIG. 1 is a perspective view illustrating an example of a boron nitride sintered body.

FIG. 1 is a perspective view illustrating an example of a boron nitride sintered body. A boron nitride sintered body 10 has a thickness 1. The thickness t is less than 2 mm. The boron nitride sintered body 10 may be manufactured by uniaxial pressing along a thickness direction. The area of a main surface 10*a* may be 25 $mm^2$ or more, may be 100 $mm^2$ or more, may be 800 $mm^2$ or more, or may be 1000 $mm^2$ or more.

Since the thickness t of the boron nitride sintered body 10 is small, the impregnating of the resin composition can be smoothly performed. Thereby, the resin can be sufficiently filled in the pores of the boron nitride sintered body, and a composite body excellent in electrical insulation properties can be obtained.

The shape of the boron nitride sintered body is not limited to a quadrilateral prism shape as illustrated in FIG. 1, and for example, may be a columnar shape or may be a C shape in which the main surface 10*a* is curved. The boron nitride sintered body may not have a cut plane. For example, the boron nitride sintered body may be obtained by sintering a molded body having a sheet shape as illustrated in FIG. 1.

A boron nitride sintered body obtained through a cutting step has fine cracks or fine irregularities (striped patterns) generated attributable to cutting on the cut plane. On the other hand, a boron nitride sintered body obtained without performing the cutting step does not have a cut plane, and thus fine cracks and irregularities (striped patterns) on the surface can be sufficiently reduced. Therefore, in the boron nitride sintered body obtained without performing the cutting step, the thermal conducting properties can be further improved while maintaining a sufficiently high strength. That is, reliability as a member of an electronic component and the like is excellent. Furthermore, when processing such as cutting is performed, material loss occurs. Therefore, in the boron nitride sintered body not having a cut plane, material loss can be reduced. Thereby, the yield of the boron nitride sintered body can be improved.

In a modified example, it is sufficient that both of a pair of main surfaces 10*a* and 10*b* of the boron nitride sintered body 10 of FIG. 1 are not cut planes. That is, a side surface of the boron nitride sintered body 10 may be a cut plane. Also in this case, fine cracks, which may be generated attributable to cutting in both of the pair of main surfaces 10*a* and 10*b*, can be sufficiently reduced. Hence sufficiently high thermal conducting properties can be maintained. Furthermore, material loss can be reduced as compared to a case where both of the pair of main surfaces 10*a* and 10*b* are cut planes. The shape of the surface of the boron nitride sintered body may be adjusted by polishing or the like. The main surface may have an area twice or more that of the side surface, or may have an area four times or more that of the side surface.

The orientation index of boron nitride crystals in the boron nitride sintered body may be 40 or less, may be 30 or less, may be 15 or less, or may be 10 or less. Thereby, the anisotropy of the thermal conducting properties can be sufficiently decreased. Hence the thermal conductivity of the sheet-shaped boron nitride sintered body along the thickness direction can be sufficiently increased.

The orientation index of the boron nitride sintered body may be 2.0 or more, may be 3.0 or more, or may be 4.0 or more. The orientation index in the present disclosure is an index for quantifying the orientation degree of boron nitride crystals. The orientation index can be calculated by a peak intensity ratio [I(002)/I(100)] of (002) plane to (100) plane of boron nitride as measured by an X-ray diffractometer.

The average pore diameter of the pores included in the boron nitride sintered body may be less than 4.0 μm. The contact area between primary particles of the boron nitride particles can be sufficiently increased by decreasing the size of the pores. Hence the thermal conductivity can be further increased. From the viewpoint of further increasing the thermal conductivity, the average pore diameter of the pores may be less than 3.8 μm, may be less than 3 μm, or may be less than 2 μm. From the viewpoint of smoothly performing the impregnating of the boron nitride sintered body with the resin composition, the average pore diameter of the pores may be 0.1 μm or more or may be 0.2 μm or more.

The average pore diameter of the pores is determined using a mercury porosimeter on the basis of pore size distribution obtained when pressurization is performed while increasing a pressure from 0.0042 MPa to 206.8 MPa. When the horizontal axis is designated as the pore diameter and the vertical axis is designated as the cumulative pore volume, a pore diameter at which the cumulative pore volume reaches 50% of the total pore volume is an average pore diameter. As the mercury porosimeter, a mercury porosimeter manufactured by SHIMADZU CORPORATION can be used.

The porosity of the boron nitride sintered body, that is, the volumetric ratio of the pores in the boron nitride sintered body may be 30 to 65% by volume, may be 30 to 60% by volume, or may be 35 to 55% by volume. When the porosity is too large, the strength of the boron nitride sintered body tends to decrease. When the porosity is too small, the mass tends to increase. Furthermore, there is a tendency that the content of the resin when a composite body is manufactured is decreased to degrade electrical insulation properties.

A bulk density [B ($kg/m^3$)] is calculated from the volume and mass of the boron nitride sintered body, and then the porosity can be determined by Formula (1) below from this bulk density and the theoretical density [2280 (kg/n)] of boron nitride.

$$\text{Porosity (\% by volume)}=[1-(B/2280)]\times 100 \quad (1)$$

The bulk density B may be 800 to 1500 $kg/m^3$, may be 850 to 1400 $kg/m^3$, or may be 900 to 1300 $kg/m^3$. When the bulk density B is too large, the mass of the boron nitride sintered body tends to increase. Furthermore, there is a tendency that the filling amount of the resin is decreased to degrade electrical insulation properties of the composite body. When the bulk density B is too small, the strength of the boron nitride sintered body tends to decrease.

The thermal conductivity of the boron nitride sintered body may be 20 W/mK or more, may be 30 W/mK or more, may be 35 W/mK or more, or may be 40 W/mK or more. When a boron nitride sintered body having a high thermal conductivity is used, a heat dissipation member sufficiently excellent in heat dissipation performance can be obtained.

The thermal conductivity (H) can be determined by Calculation Formula (2) below.

$$H = A \times B \times C \quad (2)$$

In Formula (2), H represents a thermal conductivity (W/(m·K)), A represents a thermal diffusivity ($m^2$/sec), B represents a bulk density (kg/$m^3$), and C represents a specific heat capacity (J/(kg·K)). The thermal diffusivity A can be measured by a laser flash method. The bulk density B can be determined from the volume and mass of the boron nitride sintered body. The specific heat capacity C can be measured using a differential scanning calorimeter. The boron nitride sintered body may have the above-described thermal conductivity in the thickness direction.

A composite body according to an embodiment is a composite body of a boron nitride sintered body and a resin and has the above-described boron nitride sintered body and a resin filled in at least some of the pores of the boron nitride sintered body. As the resin, for example, an epoxy resin, a silicone resin, a cyanate resin, a silicone rubber, an acrylic resin, a phenolic resin, a melamine resin, a urea resin, a bismaleimide resin, unsaturated polyester, a fluorine resin, polyimide, polyamide imide, polyether imide, polybutylene terephthalate, polyethylene terephthalate, polyphenylene ether, polyphenylene sulfide, wholly aromatic polyester, polysulfone, a liquid crystal polymer, polyether sulfone, polycarbonate, a maleimide resin, a maleimide-modified resin, an ABS (acrylonitrile-butadiene-styrene) resin, an AAS (acrylonitrile-acrylic rubber-styrene) resin, an AES (acrylonitrile-ethylene-propylene-diene rubber-styrene) resin, a polyglycolic acid resin, polyphthalamide, polyacetal, and the like can be used. These may be included singly or in combination of two or more kinds thereof.

In the case of using the composite body for an insulating layer of a printed-wiring board, from the viewpoint of improving heat resistance and adhesion strength to a circuit, the resin may include an epoxy resin. In the case of using the composite body for a thermal interface material, from the viewpoint of improving heat resistance, flexibility, and adhesion to a heat sink or the like, the resin may include a silicone resin. The resin may be a cured product, or may be a semi-cured product (in a B-stage state).

FIG. 1 is a perspective view illustrating an example of a composite body. A composite body 20 has a thickness t. The thickness t is less than 2 mm. The area of main surfaces 20*a* and 20*b* may be 25 $mm^2$ or more, may be 100 $mm^2$ or more, may be 800 $mm^2$ or more, or may be 1000 $mm^2$ or more.

Since the thickness t of the composite body 20 is small, the resin is sufficiently filled in the pores of the boron nitride sintered body 10. Therefore, the composite body is sufficiently excellent in electrical insulation properties. The thickness t of the composite body 20 may not be the same as the thickness of the boron nitride sintered body 10. For example, the boron nitride sintered body 10 may have a resin layer on the surface thereof.

The shape of the composite body is also not limited to a quadrilateral prism shape as illustrated in FIG. 1, and for example, may be a columnar shape or may be a C shape in which the main surfaces 20*a* and 20*b* are curved. The composite body may not have a cut plane. A composite body obtained without performing the cutting step does not have fine cracks that may be generated attributable to cutting. Hence the thermal conducting properties can be further improved while maintaining a sufficiently high strength. That is, reliability as a member of an electronic component and the like is excellent. Furthermore, when processing such as cutting is performed, material loss occurs. Therefore, in the composite body not having a cut plane, material loss can be reduced. Thereby, the yield of the composite body can be improved.

The content of the boron nitride particles in the composite body may be 40 to 70% by volume or may be 45 to 65% by volume, on the basis of the total volume of the composite body. The content of the resin in the composite body may be 30 to 60% by volume or may be 35 to 55% by volume, on the basis of the total volume of the composite body. In the composite body including the boron nitride particles and the resin in such ratios, both of high electrical insulation properties and a high thermal conductivity can be achieved at a high level. From the viewpoint of further improving these properties, the porosity of the composite body may be 10% by volume or less, may be 5% by volume or less, or may be 3% by volume or less. This porosity can be determined, for example, from a bulk density $B_1$ (kg/$m^3$) as determined from the volume and mass of the composite body and a theoretical density $B_2$ (kg/$m^3$) obtained when the whole pores of the boron nitride sintered body are impregnated with the resin composition.

The composite body may further include other components in addition to the boron nitride sintered body and the resin filled in the pores thereof. Examples of the other components include a curing agent, an inorganic filler, a silane coupling agent, a defoamer, a surface conditioner, a wetting and dispersing agent, and the like. The inorganic filler may include one or two or more kinds selected from the group consisting of aluminum oxide, silicon oxide, zinc oxide, silicon nitride, aluminum nitride, and aluminum hydroxide. Thereby, the thermal conducting properties of the composite body can be further improved.

The composite body of the present embodiment includes the above-described boron nitride sintered body and the resin filled in the pores thereof, and from this aspect, has both an excellent thermal conductivity and excellent electrical insulation properties. Furthermore, since the composite body is thin and lightweight, when the composite body is used as a member of an electronic component and the like, a decrease in size and weight of an electronic component and the like can be achieved. The composite body has such properties, and from this aspect, can be suitably used as a heat dissipation member. The heat dissipation member may be configured by the above-described composite body, or may be configured by combining another member (for example, a metal plate such as aluminum) and the composite body.

Examples of methods for manufacturing a boron nitride sintered body, a composite body, and a heat dissipation member will be described hereinafter. The method for manufacturing a boron nitride sintered body of this example includes a nitriding step of firing a boron carbide powder in a nitrogen pressurized atmosphere to obtain a fired product containing boron carbonitride, and a sintering step of molding and heating a blend containing the fired product and a sintering aid to obtain a boron nitride sintered body including boron nitride particles and pores.

The boron carbide powder can be prepared, for example, by the following procedures. Boric acid and acetylene black are mixed and then heated in an inert gas atmosphere at 1800 to 2400° C. for 1 to 10 hours to obtain a boron carbide lump. The boron carbide powder can be prepared by subjecting this boron carbide lump to pulverization, washing, impurity removal, and drying.

In the nitriding step, a boron carbide powder is fired in a nitrogen atmosphere to obtain a fired product containing boron carbonitride ($B_4CN_4$). The firing temperature in the nitriding step may be 1800° C. or higher or may be 1900° C. or higher. Furthermore, this firing temperature may be 2400° C. or lower or may be 2200° C. or lower. This firing temperature may be, for example, 1800 to 2400° C.

The pressure in the nitriding step may be 0.6 MPa or more or may be 0.7 MPa or more. Furthermore, this pressure may be 1.0 MPa or less or may be 0.9 MPa or less. This pressure may be, for example, 0.6 to 1.0 MPa. When the pressure is too low, there is a tendency that the nitriding of boron carbide is difficult to proceed. On the other hand, when this pressure is too high, there is a tendency that manufacturing cost is increased. Note that, the pressure in the present disclosure is an absolute pressure.

The nitrogen gas concentration of the nitrogen atmosphere in the nitriding step may be 95% by volume or more or may be 99.9% by volume or more. The partial pressure of nitrogen may be in the above pressure range. The firing time in the nitriding step is not particularly limited as long as it is in a range in which the nitriding sufficiently proceeds, and for example, may be 6 to 30 hours or may be 8 to 20 hours.

In the sintering step, the blend may be obtained by blending the fired product containing boron carbonitride particles obtained in the nitriding step and a sintering aid. The sintering aid may contain a boron compound and a calcium compound. The blend may contain 1 to 30 parts by mass of the boron compound and the calcium compound in total with respect to 100 parts by mass of the fired product. When the content is set in such a range, the grain growth is appropriately performed while suppressing excessive grain growth of primary particles to promote the sintering, and the primary particles of boron nitride are bonded firmly and intimately over the broad area.

From the viewpoint of sufficiently bonding the primary particles of boron nitride, the blend may contain, for example, 1 to 30 parts by mass, 5 to 25 parts by mass, or 8 to 20 parts by mass of the boron compound and the calcium compound in total, with respect to 100 parts by mass of the fired product.

The blend may contain 0.5 to 40 atom % or 0.7 to 30 atom % of calcium constituting the calcium compound with respect to 100 atom % of boron constituting the boron compound. When the blend contains boron and calcium in such a ratio, homogeneous grain growth of primary particles is promoted, and the thermal conductivity of the boron nitride sintered body can be further increased.

Examples of the boron compound include boric acid, boron oxide, borax, and the like. Examples of the calcium compound include calcium carbonate, calcium oxide, and the like. The sintering aid may contain a component other than boric acid and calcium carbonate. Examples of such a component include carbonates of alkali metals such as lithium carbonate and sodium carbonate. Furthermore, for moldability improvement, a binder may be blended in the blend. Examples of the binder include an acrylic compound and the like.

The pulverization of the fired product may be performed using a general pulverizer or disintegrator when the fired product and the sintering aid are blended. For example, a ball mill, a Henschel mixer, a vibrating mill, a jet mill, or the like can be used. Note that, in the present disclosure, "disintegration" is also included in "pulverization". The fired product may be pulverized and then blended with the sintering aid, or the fired product and the sintering aid may be blended and then subjected to pulverization and mixing at the same time.

The blend may be subjected to powder pressing or die molding to obtain a molded body, or may be formed into a sheet-shaped molded body by a doctor blade method or an extrusion method. The molding pressure may be, for example, 5 to 350 MPa. The molded body may have, for example, a sheet shape having a thickness of less than 2 mm. When a boron nitride sintered body is manufactured using a sheet-shaped molded body, a boron nitride sintered body not having a cut plane can be manufactured. Furthermore, as compared to a case where a block-shaped boron nitride sintered body and a block-shaped composite body are cut into a sheet shape, material loss caused by processing can be reduced in the case of using a molded body which has been formed in a sheet shape. Hence a sheet-shaped boron nitride sintered body and a sheet-shaped composite body can be manufactured at a high yield.

The molded body obtained in this way is fired, for example, heating in an electric furnace. The heating temperature may be, for example, 1800° C. or higher or may be 1900° C. or higher. This heating temperature may be, for example, 2200° C. or lower or may be 2100° C. or lower. When the heating temperature is too low, there is a tendency that the grain growth does not sufficiently proceed. The heating time may be 0.5 hours or longer, may be 1 hour or longer, may be 3 hours or longer, may be 5 hours or longer, or may be 10 hours or longer. This heating time may be 40 hours or shorter, may be 30 hours or shorter, or may be 20 hours or shorter. This heating time may be, for example, 0.5 to 40 hours or may be 1 to 30 hours. When the heating time is too short, there is a tendency that the grain growth does not sufficiently proceed. A too long heating time tends to be disadvantageous in terms of industrial aspect. The heating atmosphere may be, for example, an inert gas atmosphere such as nitrogen, helium, or argon. In the case of blending a binder in the blend, degreasing may be performed by calcining at a temperature and an atmosphere where the binder is decomposed, before the above-described heating.

Through the above steps, a sheet-shaped boron nitride sintered body including boron nitride particles and pores and having a thickness of less than 2 mm can be obtained. In this example, since boron carbonitride is used, orientation of the boron nitride particles in a direction perpendicular to the thickness direction can be suppressed. Accordingly, the anisotropy of the thermal conducting properties is decreased, and thus a boron nitride sintered body excellent in thermal conducting properties along the thickness direction can be manufactured. The range of the orientation index of the boron nitride sintered body is as described above. Furthermore, in the above-described manufacturing method, a boron nitride sintered body can be manufactured without a step of cutting a boron nitride sintered body. Thereby, a boron nitride sintered body not having a cut plane and being excellent reliability can be manufactured at a high yield.

An example of the method for manufacturing a boron nitride sintered body has been described, but the method for manufacturing a boron nitride sintered body is not limited thereto. For example, in the above-described sintering step, a boron nitride sintered body may be obtained using a commercially available boron carbonitride powder instead of the fired product containing boron carbonitride particles obtained in the nitriding step. Furthermore, for example, a boron nitride sintered body may be obtained by molding and sintering an agglomerated product obtained by drying an aqueous slurry containing a scale-shaped and/or amorphous boron nitride powder, a sintering aid, a binder, and water. By adjusting a thickness at the time of molding, a sheet-shaped boron nitride sintered body having a thickness of less than 2 mm can be obtained.

An example of the method for manufacturing a composite body includes an impregnating step of impregnating a boron nitride sintered body with a resin composition. The boron nitride sintered body may be manufactured by any of the above-described methods. The resin composition may contain a resin component, a curing agent, and a solvent, from the viewpoint of improving fluidity and handleability. Furthermore, the resin composition may contain an inorganic filler, a silane coupling agent, a defoamer, a surface conditioner, a wetting and dispersing agent, and the like, in addition to those components.

As the resin component, for example, those which become the resin having been exemplified in the above description of the composite body by a curing or semi-curing reaction can be used. Examples of the solvent include aliphatic alcohols such as ethanol and isopropanol, ether alcohols such as 2-methoxy ethanol, 1-methoxy ethanol, 2-ethoxy ethanol, 1-ethoxy-2-propanol, 2-butoxyethanol, 2-(2-methoxyethoxy)ethanol, 2-(2-ethoxyethoxy)ethanol, and 2-(2-butoxyethoxy)ethanol, glycol ethers such as ethylene glycol monomethyl ether and ethylene glycol monobutyl ether, ketones such as acetone, methyl ethyl ketone, methyl isobutyl ketone, and diisobutyl ketone, and hydrocarbons such as toluene and xylene. These may be included singly or in combination of two or more kinds thereof.

The impregnating is performed by attaching the resin composition to the boron nitride sintered body. For example, the boron nitride sintered body may be immersed in the resin composition. The impregnating may be performed in the state of the boron nitride sintered body being immersed under a pressurized or depressurized condition. In this way, the resin can be filled in the pores of the boron nitride sintered body. The boron nitride sintered body has a sheet shape and a thickness of less than 2 mm, and from this aspect, the filling of the resin in the pores can be smoothly performed. Thus, the filling rate with the resin can be sufficiently increased. Hence a composite body having excellent electrical insulation properties can be smoothly manufactured.

The impregnating step may be performed using the inside of an impregnating apparatus including an airtight container. As an example, the impregnating may be performed inside the impregnating apparatus under a depressurized condition, and then the impregnating may be performed under a pressurized condition by increasing the pressure inside the impregnating apparatus to be higher than the atmospheric pressure. By performing both the depressurized condition and the pressurized condition in this way, the resin can be sufficiently filled in the pores of the boron nitride sintered body. The depressurized condition and the pressurized condition may be repeated multiple times. The impregnating step may be performed while heating. The resin composition impregnated in the pores of the boron nitride sintered body becomes a resin (a cured product or a semi-cured product) after curing or semi-curing proceeds or the solvent volatilizes. In this way, a composite body having the boron nitride sintered body and a resin filled in the pores thereof is obtained. It is not necessary to fill the resin in all of the pores of the boron nitride sintered body, and the resin may not be filled in some of the pores. The boron nitride sintered body and the composite body may include both of closed pores and open pores.

The method may include a curing step of curing the resin filled in the pores after the impregnating step. In the curing step, for example, the composite body filled with the resin (resin composition) is extracted from the impregnating apparatus, and then the resin is cured or semi-cured by heating and/or light irradiation depending on the type of the resin (or a curing agent to be added as necessary).

The composite body obtained in this way has a sheet shape and a thin thickness. Thus, the composite body is thin and lightweight, and when the composite body is used as a member of an electronic component and the like, a decrease in size and weight of an electronic component and the like can be achieved. Furthermore, since the resin is sufficiently filled in the pores of the boron nitride sintered body, the composite body is also excellent in electrical insulation properties. Furthermore, in the above-described manufacturing method, a composite body can be manufactured without a step of cutting a boron nitride sintered body and a composite body. Therefore, a composite body excellent in reliability can be manufactured at a high yield. Note that, the composite body may be used directly as a heat dissipation member, or may be subjected to processing such as polishing and used as a heat dissipation member.

Hereinbefore, several embodiments have been described, but the present disclosure is not intended to be limited to the above-described embodiments at all. For example, in the sintering step, a boron nitride sintered body may be obtained using a hot press in which molding and sintering are simultaneously performed.

EXAMPLES

The contents of the present disclosure will be more specifically described with reference to Examples; however, the present disclosure is not limited to the following Examples.

[Boron Nitride Sintered Body]

Example 1

<Production of Boron Nitride Sintered Body>

100 parts by mass of orthoboric acid manufactured by Nippon Denko Co., Ltd. and 35 parts by mass of acetylene black (trade name: HS100) manufactured by Denka Company Limited were mixed using a Henschel mixer. The obtained mixture was filled in a graphite crucible and heated in an arc furnace in an argon atmosphere at 2200° C. for 5 hours to obtain lump boron carbide ($B_4C$). The obtained lump product was coarsely pulverized with a jaw crusher to obtain a coarse powder. This coarse powder was further pulverized with a ball mill having silicon carbide beads (ϕ10 mm) to obtain a pulverized powder. The carbon amount of the obtained boron carbide powder was 19.9% by mass. The carbon amount was measured with a carbon/sulfur simultaneous analyzer.

The prepared boron carbide powder was filled in a boron nitride crucible. Thereafter, the crucible was heated for 10 hours using a resistance heating furnace in a nitrogen gas atmosphere under the conditions of 2000° C. and 0.85 MPa. In this way, a fired product containing boron carbonitride ($B_4CN_4$) was obtained.

Powdery boric acid and powdery calcium carbonate were blended to prepare a sintering aid. Upon the preparation, 1.9 parts by mass of calcium carbonate was blended with respect to 100 parts by mass of boric acid. Regarding the atomic ratio of boron and calcium at this time, the atomic ratio of calcium was 1.2 atom % with respect to 100 atom % of boron. 19 parts by mass of the sintering aid was blended with respect to 100 parts by mass of the fired product and mixed using a Henschel mixer to obtain a powdery blend.

Figure 2:
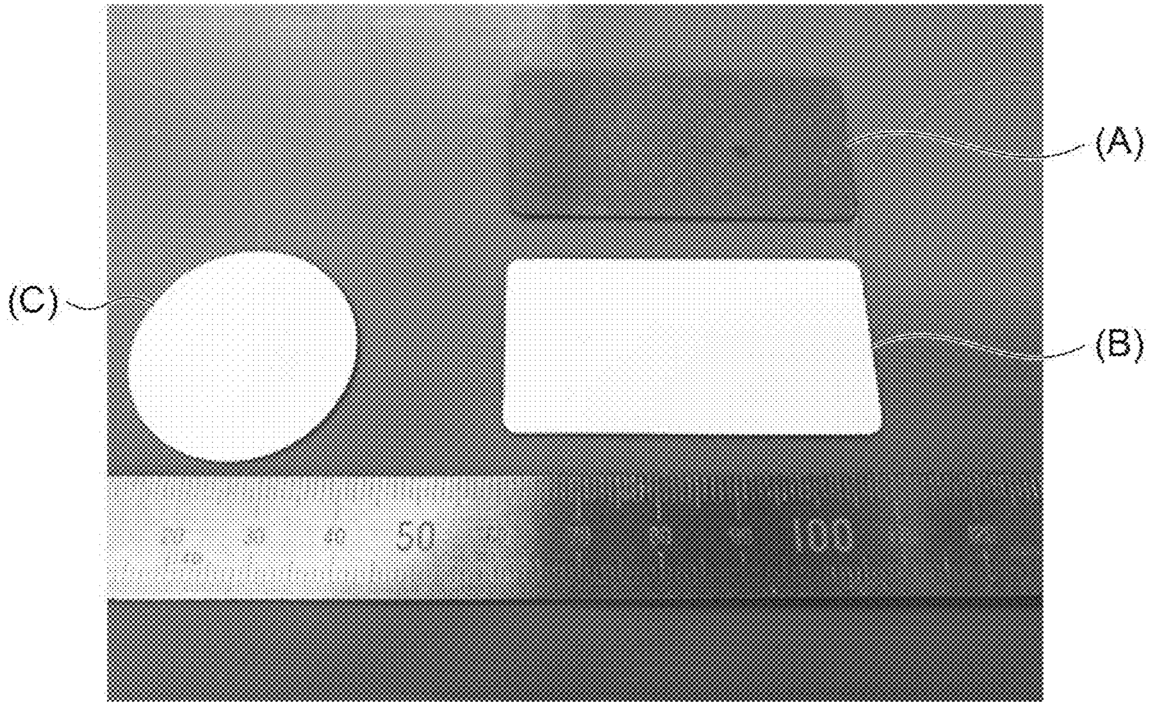
FIG. 2 is a photograph showing examples of a molded body for manufacturing a boron nitride sintered body.

0.67 g of the blend was pressurized using a powder pressing machine at 150 MPa for 30 seconds to obtain a molded body having a sheet shape (length×width×thickness=49 mm×25 mm×0.38 mm) as shown in FIG. 2(A). The molded body was put in a boron nitride container and introduced into a batch-type high-frequency furnace. In the batch-type high-frequency furnace, heating was performed for 5 hours under the conditions of normal pressure, a nitrogen flow rate of 5 L/min, and 2000° C. Thereafter, a sintered body was extracted from the boron nitride container. This sintered body was a porous sintered body (boron nitride sintered body) including boron nitride particles and pores. In this way, a sheet-shaped (flat plate-shaped) boron nitride sintered body was obtained. The thickness t of the boron nitride sintered body was 0.40 mm.

<Measurement of Thickness>

The thickness of the boron nitride sintered body was measured with a micrometer. Results are shown in Table 1.

<Measurement of Thermal Conductivity>

The thermal conductivity (H) of the boron nitride sintered body in the thickness direction was determined by Calculation Formula (3) below.

$$H = A \times B \times C \quad (3)$$

In Formula (3), H represents a thermal conductivity (W/(m·K)), A represents a thermal diffusivity ($m^2$/sec), B represents a bulk density (kg/$m^3$), and C represents a specific heat capacity (J/(kg·K)). The thermal diffusivity A was measured using a sample, which was obtained by processing the boron nitride sintered body into a predetermined size (length×width=10 mm×10 mm), by a laser flash method. As a measurement apparatus, a xenon flash analyzer (manufactured by NETZSCH-GerAtebau GmbH, trade name: LFA447 NanoFlash) was used. The bulk density B was calculated from the volume and mass of the boron nitride sintered body. Results of the thermal conductivity H and the bulk density B are shown in Table 1. The specific heat capacity C was set to 0.79 (J/(kg·K)).

<Measurement of Average Pore Diameter>

The pore volume distribution of the obtained boron nitride sintered body was measured using a mercury porosimeter (device name: AutoPore IV 9500) manufactured by SHIMADZU CORPORATION while increasing a pressure from 0.0042 MPa to 206.8 MPa. In the cumulative pore volume distribution, a pore diameter at which the cumulative pore volume reaches 50% of the total pore volume was regarded as the "average pore diameter". Results are shown in Table 1.

<Measurement of Porosity>

The porosity was determined by Calculation Formula (4) below from the bulk density B calculated as described above and the theoretical density (2280 kg/$m^3$) of boron nitride. Results are shown in Table 1.

$$\text{Porosity (\% by volume)}=[1-(B/2280)]\times 100 \quad (4)$$

<Measurement of Orientation Index>

The orientation index [I(002)/I(100)] of the boron nitride sintered body was determined using an X-ray diffractometer (manufactured by Rigaku Corporation, trade name: ULTIMA-IV). A measurement sample (boron nitride sintered body) set on a sample holder of the X-ray diffractometer was irradiated with X rays to perform baseline correction. Thereafter, the peak intensity ratio of (002) plane to (100) plane of boron nitride was calculated. This peak intensity ratio was regarded as the orientation index [I(002)/I(100)]. Results were as shown in Table 1.

Example 2

An amorphous boron nitride powder having an oxygen content of 1.7% by mass and an average particle diameter of 3.4 μm and a hexagonal boron nitride powder having an oxygen content of 0.1% by mass and an average particle diameter of 16.0 μm were prepared. 10.7 parts by mass of the amorphous boron nitride powder, 7.1 parts by mass of the hexagonal boron nitride powder, 0.9 parts by mass of calcium carbonate (manufactured by Shiraishi Kogyo Kaisha, Ltd., trade name: PC-700), and 1.6 parts by mass of boric acid were mixed using a Henschel mixer to obtain a mixture. Thereafter, 380 parts by mass of water was added with respect to 100 parts by mass of the mixture and pulverized with a ball mill for 5 hours to obtain an aqueous slurry. Polyvinyl alcohol (manufactured by Nippon Synthetic Chemical Industry Co., Ltd., trade name: GOHSENOL) was added to this aqueous slurry so that the concentration thereof was 3.0% by mass, and the resultant mixture was heated and stirred at 50° C. until dissolved. Thereafter, the aqueous slurry was subjected to a spheroidizing treatment at a drying temperature of 200° C. in a spray dryer to obtain an agglomerated product. As a spheroidizing device of the spray dryer, a rotary atomizer was used.

0.58 g of the agglomerated product obtained by the spheroidizing treatment was pressurized using a powder pressing machine at 25 MPa for 30 seconds to obtain a molded body having a sheet shape (length×width×thickness=49 mm×25 mm×0.38 mm) as shown in FIG. 2(B). The molded body was put in a boron nitride container and introduced into a batch-type high-frequency furnace. In the batch-type high-frequency furnace, heating was performed for 10 hours under the conditions of normal pressure, a nitrogen flow rate of 5 L/min, and 2050° C. Thereafter, a sintered body was extracted from the boron nitride container. This sintered body was a porous sintered body (boron nitride sintered body) including boron nitride particles and pores. In this way, a sheet-shaped (flat plate-shaped) boron nitride sintered body was obtained. The thickness t of the boron nitride sintered body was 0.40 mm.

Each measurement of the boron nitride sintered body obtained in this way was performed in the same manner as in Example 1. Measurement results were as shown in Table 1.

Example 3

A molded body having a sheet shape (diameter×thickness=30 mm×0.38 mm) as shown in FIG. 2(C) was obtained by the same procedures as in Example 2. A sheet-shaped (circular plate-shaped) boron nitride sintered body was obtained in the same manner as in Example 2, except that this molded body was used. The thickness t of the boron nitride sintered body was 0.40 mm. Each measurement of the boron nitride sintered body obtained in this way was performed in the same manner as in Example 1. Measurement results were as shown in Table 1.

Example 4

A molded body having a sheet shape (length×width×thickness=49 mm×25 mm×0.55 mm) as shown in FIG. 2(B)

was obtained by the same procedures as in Example 1, except that the mass of the blend at the time of being molded with a powder pressing machine was set to 0.97 g. A sheet-shaped (flat plate-shaped) boron nitride sintered body was obtained in the same manner as in Example 1, except that this molded body was used. The thickness t of the boron nitride sintered body was 0.58 mm. Each measurement of the boron nitride sintered body obtained in this way was performed in the same manner as in Example 1. Measurement results were as shown in Table 1.

Example 5

A molded body having a sheet shape (length×width×thickness=49 mm×25 mm×0.27 mm) as shown in FIG. 2(B) was obtained by the same procedures as in Example 3, except that the mass of the blend at the time of being molded with the powder pressing machine was set to 0.47 g. A sheet-shaped (flat plate-shaped) boron nitride sintered body was obtained in the same manner as in Example 3, except that this molded body was used. The thickness t of the boron nitride sintered body was 0.28 mm. Each measurement of the boron nitride sintered body obtained in this way was performed in the same manner as in Example 1. Measurement results were as shown in Table 1.

Example 6

A molded body having a sheet shape (length×width×thickness 49 mm×25 mm×0.35 mm) as shown in FIG. 2(B) was obtained by the same procedures as in Example 1, except that the pressurizing pressure of the powder pressing machine was set to 300 MPa. A sheet-shaped (flat plate-shaped) boron nitride sintered body was obtained in the same manner as in Example 1, except that this molded body was used. The thickness t of the boron nitride sintered body was 0.37 mm. Each measurement of the boron nitride sintered body obtained in this way was performed in the same manner as in Example 1. Measurement results were as shown in Table 1.

Example 7

A molded body having a sheet shape (length×width×thickness=49 mm×25 mm×0.48 mm) as shown in FIG. 2(B) was obtained by the same procedures as in Example 1, except that the pressurizing pressure of the powder pressing machine was set to 15 MPa. A sheet-shaped (flat plate-shaped) boron nitride sintered body was obtained in the same manner as in Example 1, except that this molded body was used. The thickness t of the boron nitride sintered body was 0.51 mm. Each measurement of the boron nitride sintered body obtained in this way was performed in the same manner as in Example 1. Measurement results were as shown in Table 1.

TABLE 1

| | Thickness [mm] | Thermal conductivity [W/m · K] | Average pore diameter [μm] | Porosity [% by volume] | Bulk density [kg/m³] | Orientation index |
|---|---|---|---|---|---|---|
| Example 1 | 0.40 | 43 | 0.7 | 50.4 | 1130 | 6 |
| Example 2 | 0.40 | 35 | 3.7 | 53.1 | 1070 | 32 |
| Example 3 | 0.40 | 32 | 3.6 | 53.5 | 1060 | 34 |
| Example 4 | 0.58 | 44 | 0.6 | 50.0 | 1140 | 8 |
| Example 5 | 0.28 | 40 | 0.7 | 51.8 | 1100 | 7 |

TABLE 1-continued

| | Thickness [mm] | Thermal conductivity [W/m · K] | Average pore diameter [μm] | Porosity [% by volume] | Bulk density [kg/m³] | Orientation index |
|---|---|---|---|---|---|---|
| Example 6 | 0.37 | 48 | 0.3 | 46.1 | 1230 | 9 |
| Example 7 | 0.51 | 31 | 0.8 | 61.0 | 890 | 7 |

[Composite Body]

<Production of Composite Body>

A resin composition containing an epoxy resin (manufactured by Mitsubishi Chemical Corporation, trade name: Epikote 807) and a curing agent (manufactured by Nippon Synthetic Chemical Industry Co., Ltd., trade name: Akumex H-84B) was applied to each of the boron nitride sintered bodies of Examples 1 to 7 using a bar coater at the atmospheric pressure, and each boron nitride sintered body was impregnated with the resin composition. After the impregnating, the resin was cured by heating at the atmospheric pressure and at a temperature of 120° C. for 120 minutes to obtain composite bodies of Examples 1 to 7. These composite bodies all had the thickness and the thermal conductivity that were equal to those of the boron nitride sintered bodies. Therefore, the composite bodies are useful as a heat dissipation member of an electronic component.

<Measurement of Thickness>

The thickness of the composite body was measured with a micrometer.

<Measurement of Thermal Conductivity>

The thermal conductivity (H) of the composite body in the thickness direction was determined by Calculation Formula (4) below.

$$H = A \times B_1 \times C \tag{4}$$

In Formula (4), H represents a thermal conductivity (W/(m·K)), A represents a thermal diffusivity ($m^2$/sec), $B_1$ represents a bulk density (kg/$m^3$), and C represents a specific heat capacity (J/(kg·K)). The thermal diffusivity A was measured using a sample, which was obtained by processing the composite body into a size of length×width×thickness=10 mm×10 mm, by a laser flash method. As a measurement apparatus, a xenon flash analyzer (manufactured by NETZSCH-GeratebauGmbH, trade name: LFA447 NanoFlash) was used. The bulk density $B_1$ was calculated from the volume and mass of the composite body. The specific heat capacity C was set to 0.97 (J/(kg·K)).

<Measurement of Porosity>

The porosity of the composite body was calculated from the bulk density $B_1$ (kg/$m^3$) as determined from the volume and mass of the composite body and the theoretical density $B_2$ (kg/$m^3$) obtained when the whole pores of the boron nitride sintered body were impregnated with the resin composition, on the basis of Formula (5) below.

$$\text{Porosity (\% by volume) of composite body} = [1-(B_1/B_2)]\times 100 \tag{5}$$

Note that, the theoretical density $B_2$ (kg/$m^3$) obtained when the whole pores of the boron nitride sintered body were impregnated with the resin composition was calculated from the bulk density B (kg/$m^3$) of the boron nitride sintered body, the porosity P (% by volume) of the boron nitride sintered body, and the theoretical density (1240 $kg/m^3$) of the resin composition, on the basis of Formula (6) below.

$$\text{Theoretical density } B_2(kg/m^3)=B+P/100\times 1240 \quad (6)$$

<Measurement of Dielectric Breakdown Voltage>

The dielectric breakdown voltage of the composite body obtained as described above was evaluated. Specifically, two sheets of conductive tape were pasted on both surface of the composite body to prepare a measurement sample. The dielectric breakdown voltage was measured for the obtained measurement sample according to JIS C2110-1:2016 using a withstand voltage tester (manufactured by KIKUSUI ELECTRONICS CORPORATION, device name: TOS-8700). Results of the thickness, the thermal conductivity, the bulk density, the porosity, and the dielectric breakdown voltage of the composite body were as shown in Table 2.

TABLE 2

| | Thickness [mm] | Thermal conductivity [W/m · K] | Bulk density [$kg/m^3$] | Porosity [% by volume] | Dielectric breakdown voltage [kV] |
|---|---|---|---|---|---|
| Example 1 | 0.40 | 41 | 1696 | 2.8 | 8.4 |
| Example 2 | 0.40 | 38 | 1560 | 5.5 | 7.2 |
| Example 3 | 0.40 | 31 | 1548 | 5.4 | 6.9 |
| Example 4 | 0.58 | 41 | 1700 | 3.4 | 6.9 |
| Example 5 | 0.28 | 43 | 1638 | 3.5 | 8.0 |
| Example 6 | 0.37 | 48 | 1843 | 2.9 | 8.6 |
| Example 7 | 0.51 | 30 | 1290 | 6.1 | 6.6 |

The dielectric breakdown voltage of the composite body of each Example was sufficiently high. From this point, it was confirmed that the composite body has excellent electrical insulation properties.

INDUSTRIAL APPLICABILITY

According to the present disclosure, there are provided a boron nitride sintered body and a composite body which are thin and suitable as a member of an electronic component and the like, and manufacturing methods therefor. Furthermore, a heat dissipation member which is suitable as a member of an electronic component and the like is provided.

REFERENCE SIGNS LIST

10: boron nitride sintered body, 20: composite body.

The invention claimed is:

1. A composite body comprising:

a boron nitride sintered body including boron nitride particles and pores; and a resin filled in at least some of the pores of the boron nitride sintered body, wherein the boron nitride sintered body has a sheet shape and a thickness of less than 2 mm, wherein the boron nitride sintered body does not have a cut plane, wherein an average pore diameter of the pores of the boron nitride sintered body is less than 4.0 μm; and wherein an orientation index of the boron nitride sintered body is 40 or less.

2. The composite body according to claim 1, wherein a porosity of the boron nitride sintered body is 30 to 65% by volume.

3. The composite body according to claim 1, wherein a bulk density of the boron nitride sintered body is 800 to 1500 $kg/m^3$.

* * * * *